United States Patent [19]
Yetter

[11] Patent Number: 5,944,210
[45] Date of Patent: *Aug. 31, 1999

[54] DEVICE BOX WITH INTEGRAL LATCHING ARRANGEMENT

[75] Inventor: Karl Yetter, Gales Ferry, Conn.

[73] Assignee: Hubbell Incorporated, Orange, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/847,243

[22] Filed: May 1, 1997

Related U.S. Application Data

[63] Continuation of application No. 08/376,739, Jan. 23, 1995, abandoned.

[51] Int. Cl.⁶ .............................. B65D 45/16; H02G 3/14; H02G 3/18
[52] U.S. Cl. ........................ 220/4.21; 220/3.3; 220/3.8; 220/3.94; 220/4.02; 220/241; 220/326; 264/478
[58] Field of Search ..................................... 220/784, 326, 220/4.21, 3.94, 3.8, 3.3, 4.02, 241, 242; 174/52.1, 67; 267/318, 478

[56] References Cited

U.S. PATENT DOCUMENTS

| | | | |
|---|---|---|---|
| 1,257,375 | 2/1918 | Meacham | 220/3.92 X |
| 2,063,099 | 12/1936 | Loock | 174/52.1 |
| 2,665,353 | 1/1954 | Popp | 220/306 X |
| 2,782,954 | 2/1957 | Antonucci | 220/3.92 |
| 3,407,958 | 10/1968 | Konijnenberg et al. | 220/4.21 |
| 3,495,024 | 2/1970 | Bowman | 174/52.1 |
| 3,701,837 | 10/1972 | Fork | 220/3.4 X |
| 3,782,580 | 1/1974 | Pedersen et al. | |
| 3,825,110 | 7/1974 | Halbich et al. | |
| 4,132,344 | 1/1979 | Jewell | 220/4.21 X |
| 4,247,738 | 1/1981 | Bonato | 220/3.4 X |
| 4,296,454 | 10/1981 | Wong | 220/4.21 X |
| 4,344,646 | 8/1982 | Michel | |
| 4,365,711 | 12/1982 | Long et al. | |
| 4,582,219 | 4/1986 | Mortensen et al. | |
| 4,797,507 | 1/1989 | Lofving | 174/52.1 X |
| 4,840,286 | 6/1989 | Heberling et al. | 220/306 |
| 5,154,292 | 10/1992 | Bartucca et al. | 220/4.21 X |

FOREIGN PATENT DOCUMENTS

| | | |
|---|---|---|
| 1269052 | 5/1990 | Canada . |
| 368693 | 5/1990 | European Pat. Off. . |
| 2815526 | 7/1994 | Germany . |

OTHER PUBLICATIONS

Kellems' "Wire Management Products" Catalog—p. 111; 1992.

Primary Examiner—Stephen Castellano
Assistant Examiner—Niki M. Eloshway
Attorney, Agent, or Firm—Jerry M. Presson; David L. Tarnoff; Joseph J. Buczynski

[57] ABSTRACT

A device box having a cover member and a base member releasably coupled together by a snap-fit latching arrangement. Preferably, both the cover member and the base member are integrally molded as one-piece, unitary members with only non-hidden surfaces so that they can be manufactured by straight draw-type injection molding techniques, rather than by molds using sliders. The latching arrangement of the preferred embodiments includes one or more latch members resiliently coupled to the base member for releasably engaging one or more apertures in the cover member.

21 Claims, 12 Drawing Sheets

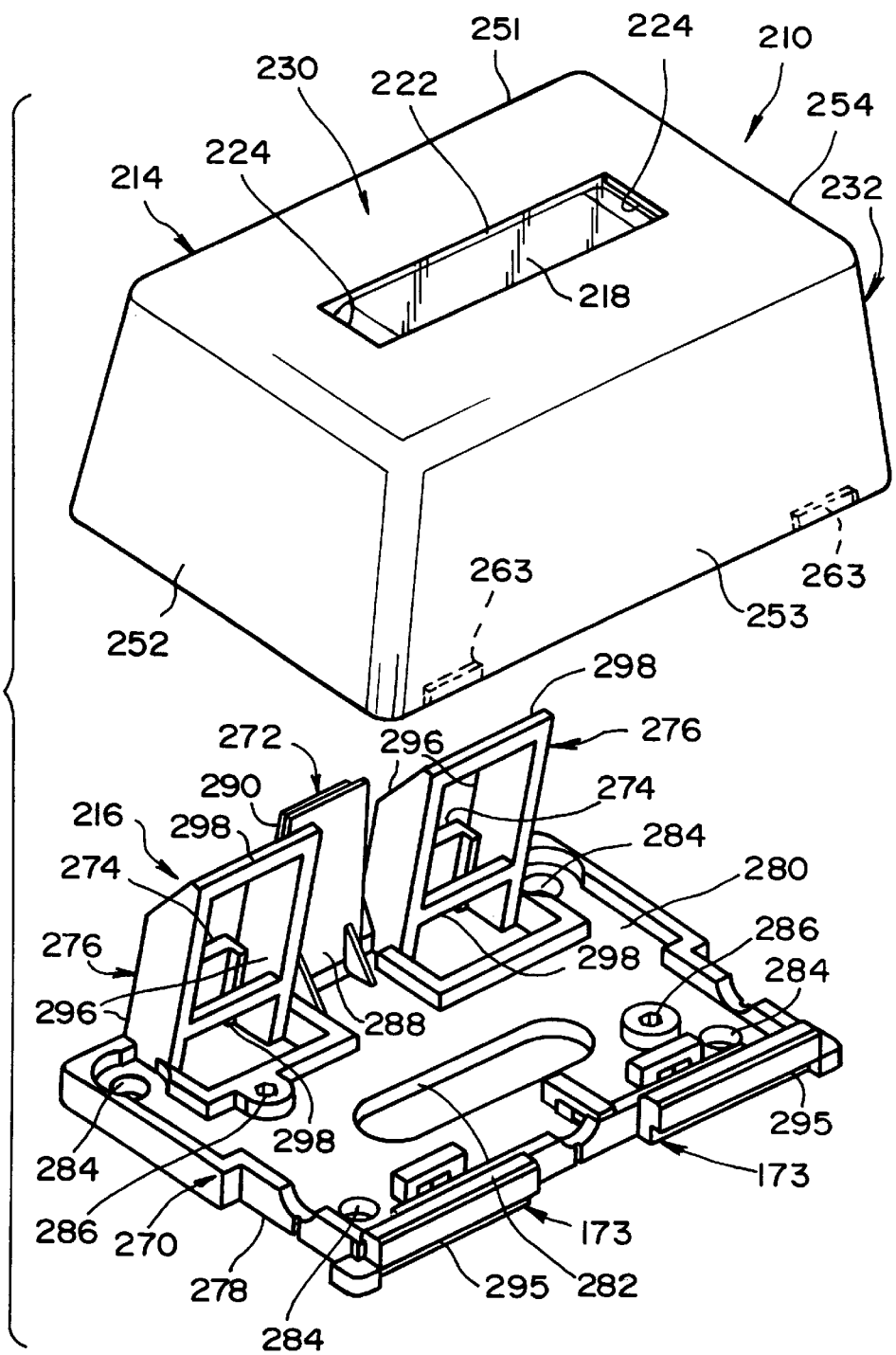

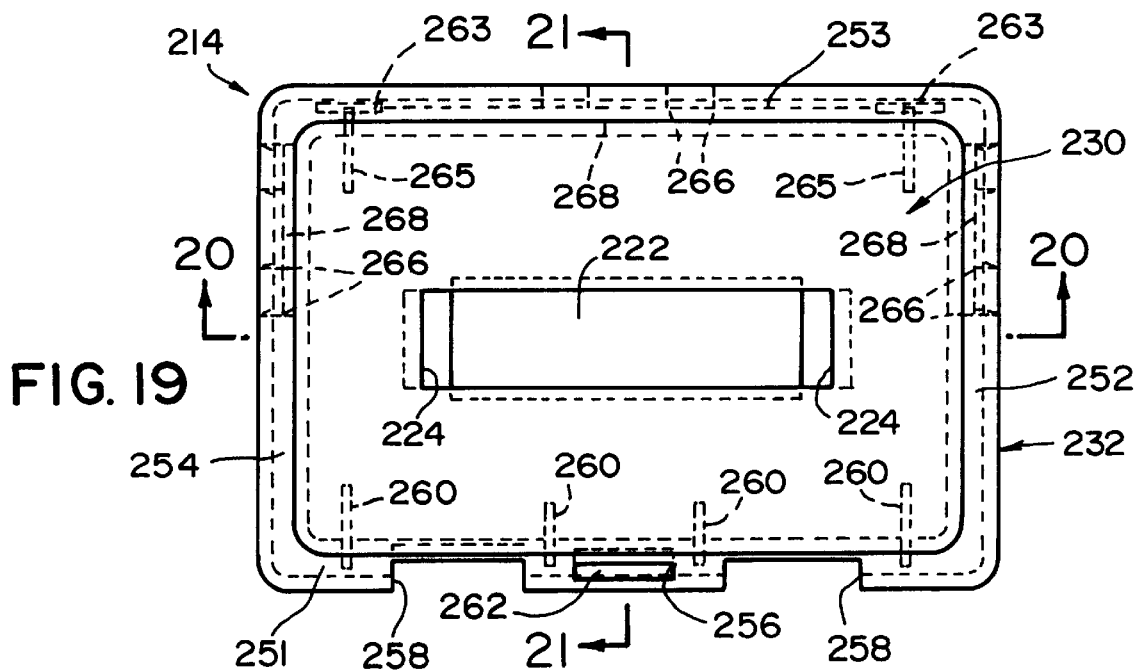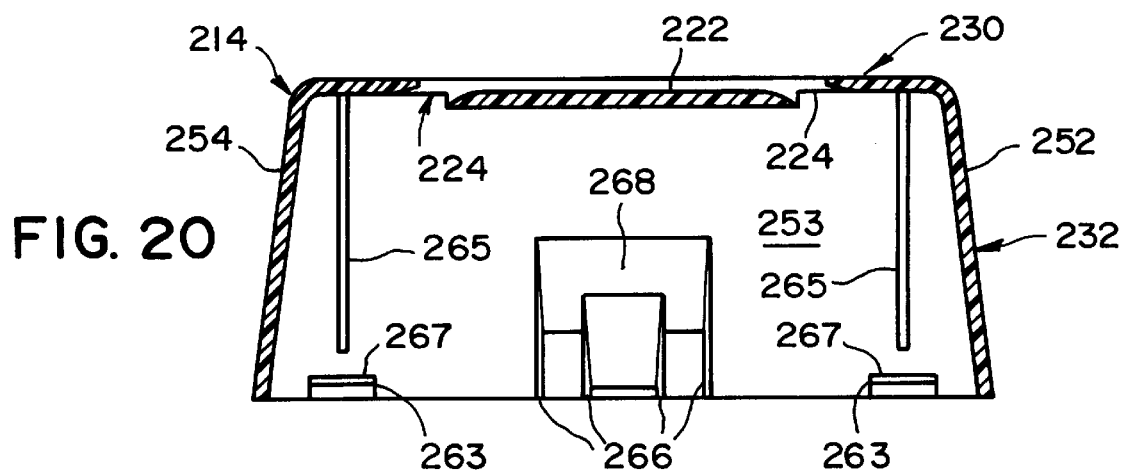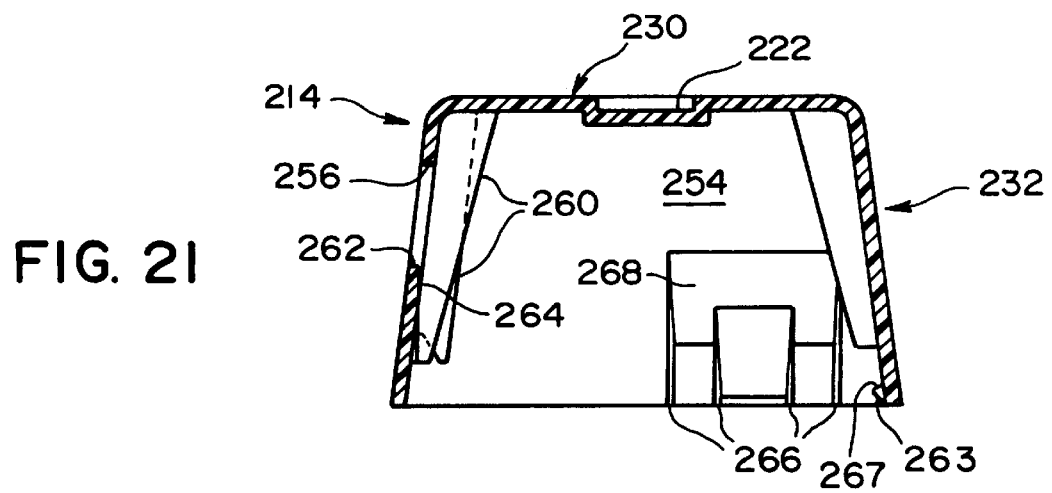

DEVICE BOX WITH INTEGRAL LATCHING ARRANGEMENT

This a continuation of application Ser. No. 08/376,739 filed Jan. 23, 1995 now abandoned.

FIELD OF THE INVENTION

The present invention generally relates to a molded device box with an integral latching arrangement. More specifically, the present invention relates to a plastic device box for use in low voltage and/or fiber optic communications applications. The device box of the present invention has a base member and a cover member releasably coupled to the base member by a snap-fit latching arrangement integrally formed therewith.

BACKGROUND OF THE INVENTION

Device boxes have been used for many years to mount various electrical devices and/or to provide a junction for joining wires and cables together on an existing wall. Typically, device boxes are designed to receive wires and/or cables running through conduits on the exterior surface of the wall, or wires and/or cables running through the interior of the walls. Device boxes are currently designed for a wide variety of applications, including low voltage and/or fiber optic communications applications as well as high voltage applications. Some prior art device boxes are specifically designed for high voltage applications, other are specifically designed for low voltage and/or fiber optic communications applications, and still others are designed for most any type of application.

In the past, most device boxes were constructed out of metal. However, more recently plastic device boxes have become more popular since they are typically less expensive to manufacture than metallic device boxes. In high voltage applications, such as device boxes housing power conductors or distribution devices, most local codes require a tool or some other safety feature to prevent easy removal of the cover of the device box. In low voltage and/or fiber optic communications applications, on the other hand, most local codes and UL requirements do not require a tool or other safety feature to prevent easy removal of the cover of the device box. Rather, easy positive latching and unlatching is desired in device boxes used in low voltage and/or fiber optic communications applications.

While numerous prior art device boxes exist for low voltage and/or fiber optic communications applications, these prior art device boxes have several disadvantages to them. For example, many of the prior art devices require a tool for unlatching the cover of the device box. This often makes installation and/or servicing of the device box difficult and time consuming. In addition, some of the prior art device boxes utilize a complex latching arrangement, which increases the costs of manufacture of the device box. Still other prior art device boxes do not provide a positive lock between the cover member and the base member, which can cause the cover member to be inadvertently disengaged from the base member by an indirect force being applied to the box components other than the latch. Moreover, many of the prior art device boxes have latching arrangements which are not aesthetically pleasing.

Examples of some prior art device boxes which have been manufactured by the Kellems Division of Hubbell Incorporated, includes the Wall Tracks® fixture box with a screw mounted cover and the WallTrak® device box with a snap on cover and screw mounted face plate. Both of these WallTrak® boxes require using a tool to access the interior of each of the boxes. Examples of latching arrangements on various types of items are disclosed in U.S. Pat. No. 3,782,580 to Pedersen et al; U.S. Pat. No. 3,825,110 to Halbich et al; U.S. Pat. No. 4,344,646 to Michel; U.S. Pat. No. 4,365,711 to Long et al; and U.S. Pat. No. 4,582,219 to Mortensen et al. Other examples of latching arrangements are disclosed in European Patent Application No. 368,693 to Gefitec S. A.; Canadian Patent No. 1,269,052 to W. R. Grace Co.; and German Patent No. 28 15 526 to Standard Elektrik Lorenz A. G.

In view of the foregoing problems, it is apparent there exists a need in the art for a low voltage and/or fiber optic communications applications device box which is relatively easy to use and inexpensive to manufacture, and which has a latching arrangement to allow positive latching and unlatching of its cover from its base without the need of a tool. The device box of the present invention addresses this need in the art, along with other needs which will become apparent to those skilled in the art once given this disclosure.

SUMMARY OF THE INVENTION

One object of the present invention is to provide a device box which has a latching arrangement that allows positive latching and unlatching of its cover member from its base member without the need of a tool.

Another object of the present invention is to provide a device box with its latching parts integrally molded to the base member and the cover member such that the latching parts of the present invention do not have any hidden surfaces.

Another object of the present invention is to provide a device box which is relatively easy and inexpensive to manufacture.

Still another object of the present invention is to provide a device box in which its cover member will not disengage from its base member due to application of an indirect unlatching force being applied to box components other than the latch.

A further object of the present invention is to provide a device box which has an aesthetically pleasing latching arrangement to provide a cover member with a relatively smooth outer surface.

The foregoing objects are basically attained by providing a plastic device box, comprising a first member including a top wall portion, a first side wall portion, and a first coupling arrangement with a first aperture and a first latching surface; and a second member formed as an integral, one-piece, unitary member with only nonhidden surfaces, and including a bottom wall having a second coupling arrangement formed thereon for releasably engaging the first coupling arrangement of the first member, the second coupling arrangement having at least one resilient latch member extending outwardly from the bottom wall with a first release button for releasably engaging the first aperture of the first member and a second latching surface for releasably engaging the first latching surface.

The foregoing objects are further attained by providing a plastic device box, comprising a cover member including a top wall portion, a first side wall portion integrally formed as a one-piece, unitary member with the top wall, and a first latching surface formed on the first side wall portion, the top wall portion and the first side wall portion together with the first latching surface being formed only with non-hidden surfaces; and a base member including a bottom wall portion, a second side wall portion integrally formed as a one-piece, unitary member with the bottom wall portion, and second latching surface formed on the second side wall portion, the bottom wall portion and the second side wall portion together with the second latching surface being formed only with non-hidden surfaces, at least one of the side wall portions being resiliently molded for relative transverse movement of one of the latching surfaces formed thereon to provide a snap-fit between the first and second latching surfaces to releasably couple the cover member to the base member.

The foregoing objects can also be attained by providing a device box produced by straight draw-type injection molding, comprising a one-piece, unitary cover member consisting of non-hidden surfaces produced by straight draw-type injection molding; a one-piece, unitary base member consisting of non-hidden surfaces produced by straight draw-type injection molding; and a latching arrangement with a first latching surface integrally formed on the cover member by straight draw-type injection molding and a second latching surface integrally formed on the base member by straight draw-type injection molding for releasably coupling the cover member to the base member, one of the latching surfaces being resiliently molded to one of the members for transverse movement to provide a snap-fit between the first and second latching surfaces to releasably couple the cover member to the base member.

The foregoing objects can still further be attained by the method of manufacturing a plastic device box, comprising the steps of injection molding a cover member via a straight draw-type mold to form a top wall portion, a first side wall portion integrally formed as a one-piece, unitary member with the top wall portion, and a first latching surface formed on the first side wall portion, the top wall portion and the first side wall portion together with the first latching surface being formed only with non-hidden surfaces, and injection molding a base member via a straight draw-type mold to form a bottom wall portion, a second side wall portion integrally formed as a one-piece, unitary member with the bottom wall portion, and a second latching surface formed on the second side wall portion, the bottom wall portion and the second side wall portion together with the second latching surface being formed only with non-hidden surfaces, one of the side wall portions being resiliently molded during one of the injection molding steps for relative transverse movement of one of the latching surfaces formed thereon to provide a snap-fit between the first and second latching surfaces to releasably couple the cover member to the base member.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring now to the drawings which form part of this original disclosure:

FIG. 18 is an exploded perspective view of a device box in accordance with a third embodiment of the present invention;

FIG. 19 is a top plan view of the cover member of the device box illustrated in FIG. 18;

FIG. 20 is a transverse cross-sectional view of the cover member illustrated in FIG. 19 taken along section line 20—20 of FIG. 19;

FIG. 21 is a transverse cross-sectional view of the cover member illustrated in FIGS. 19 and 20 taken along section line 21—21 of FIG. 19;

DETAILED DESCRIPTION OF THE PREFERRED EMBODIMENTS

Figure 1:
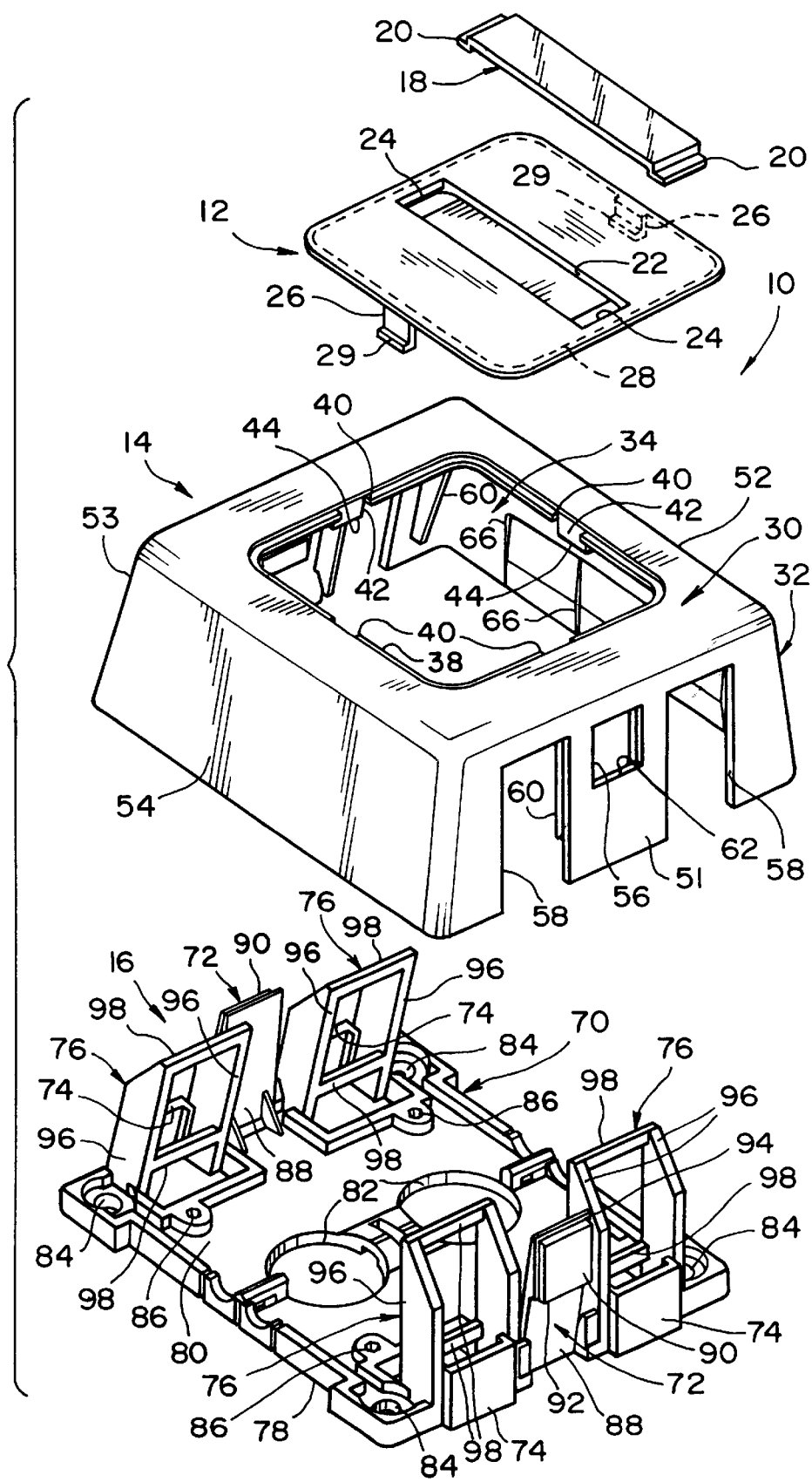
FIG. 1 is an exploded perspective view of a device box in accordance with a first embodiment of the present invention.

Referring initially to FIGS. 1–8, a device box 10 in accordance with a first embodiment of the present invention is illustrated. Device box 10 of the first embodiment includes a face plate 12, a cover member 14 and a base member 16. Preferably, face plate 12, cover member 14 and base member 16 are each constructed out of a hard, rigid plastic material with limited flexibility and resiliency so that the face plate 12 is releasably coupled to cover member 14 via a snap-fit, and cover member 14 is releasably coupled to base member 16 via a snap-fit latching arrangement 17.

Face plate 12, cover member 14 and base member 16 are each formed by straight draw-type injection molding. Therefore, construction of device box 10 does not require the use of sliders in its constructions. Sliders are used in other injection molding techniques to form surfaces on the part being molded that are positioned on the part such that it is impossible for the mold itself to form that particular surface. These types of surfaces are "hidden" from the molds. Of course, it will be apparent to those skilled in the art from this disclosure that one or two of the parts of device box 10 could be constructed using other injection molding techniques which require the use of a slider. However, using injection molding techniques which requires a slider typically increases the cost of construction of the subject device box 10 since sliders are separate elements from the molds themselves, and since the molding process must include the steps of placing the sliders in the molds as well as removing the sliders, in addition to the molds, from the molded part.

Basically, a part constructed by straight, draw-type molds has no hidden surfaces. Therefore, no sliders are used since all surfaces on the part to be molded can be formed by one of the two molds forming the part. The term "non-hidden surface(s)" as used in this disclosure is referring to a surface or surfaces on an integrally molded, one-piece, unitary member. These surfaces either face one of a pair of molds or extend parallel to the direction of separation of the straight draw-type molds such that the pair of straight draw-type molds can form all the surfaces and then be separated from the injection molded part without using sliders to form any of the surfaces of the molded part. The phrase "hidden surface(s)" as used in this disclosure refers to a surface or surfaces of a molded part which does not directly face a straight draw-type mold. In other words, a hidden surface is a surface which faces another surface of the molded part such that a pair of straight draw-type molds cannot be used to form the hidden surface. The phrase "draw-type injection molding" as used herein refers to the use of an injection mold comprised of two halves which are separated from each other by moving each half of the mold apart from the other along a straight line to create an injection molded part without the use of mold sliders to create hidden surfaces.

Figure 2:
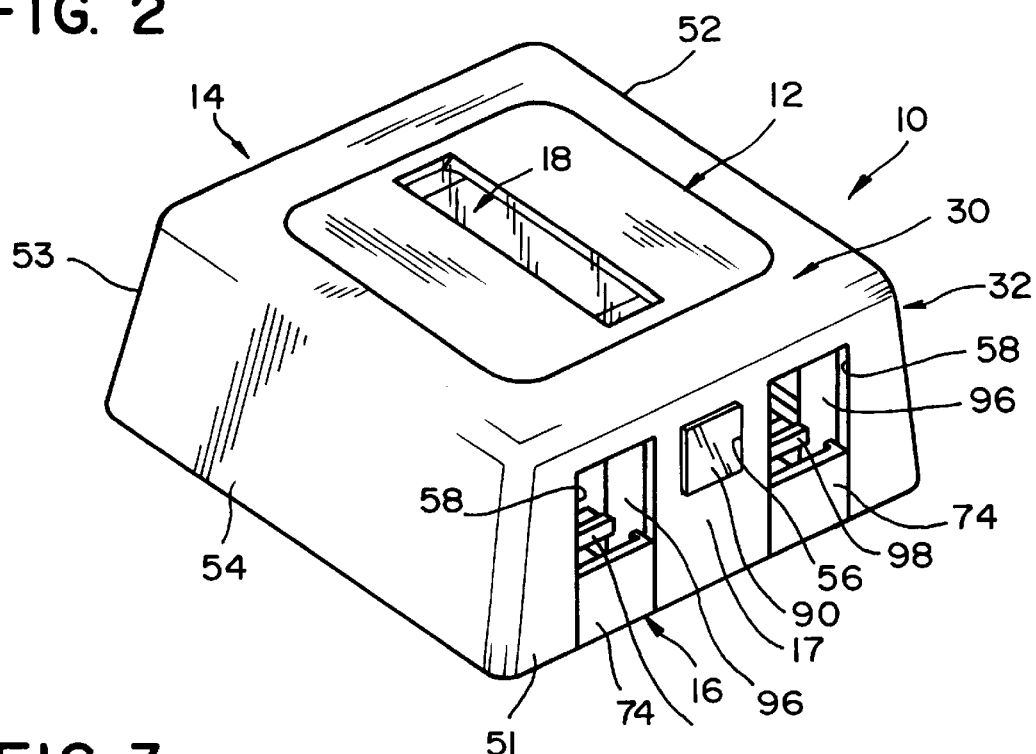
FIG. 2 is an assembled perspective view of the device box illustrated in FIG. 1.

As seen in FIGS. 1 and 2, face plate 12 is illustrated in the form of an identification plate having a clear plastic shield 18 removably coupled thereto for retaining therebetween a sheet material with identifying indicia thereon. Shield 18 is preferably a one-piece, unitary member which is integrally formed from a substantially rigid, hard plastic material with limited flexibility and resiliency to allow a snap-fit between shield 18 and face plate 12. Preferably, shield 18 is constructed of a thermoplastic material which has a pair of end tabs 20 for coupling to face plate 12 as discussed below.

Face plate 12 is a substantially square, flat member having a centrally located, rectangular recess 22 with a pair of openings 24 for receiving shield 18 therein via a snap-fit, a pair of hook-shaped latch members 26 for releasably coupling face plate 12 to cover member 14, and a peripheral ledge 28 for engaging cover member 14.

Openings 24 of recess 22 accommodates end, tabs 20 of shield 18 for coupling shield 18 thereto. Specifically, shield 18 is flexed or bowed outwardly so that end tabs 20 move inwardly towards each other so that end tabs 20 can be received within openings 24 of face plate 12 via a snap-fit. In this position, the outer surface of shield 18 is flush with the outer surface of face plate 12 so that the transition between face plate 12 and shield 18 is substantially smooth and uninterrupted.

Latch members 26 are somewhat resilient for releasably engaging cover member 14 via a snap-fit. Specifically, each of the latch members 26 has a latching surface 29 which releasably engages a portion of cover member 14. Ledge 28 is formed by reducing the thickness of the peripheral surface of face plate 12 so that the outer surface of face plate 12 is substantially flush with the outer surface of cover member 14 to form a substantially smooth outer surface as discussed below. Alternatively, face plate 12 can be integrally formed or molded with cover member 14 as a one-piece, unitary member as in the later embodiments discussed herein.

Figure 3:
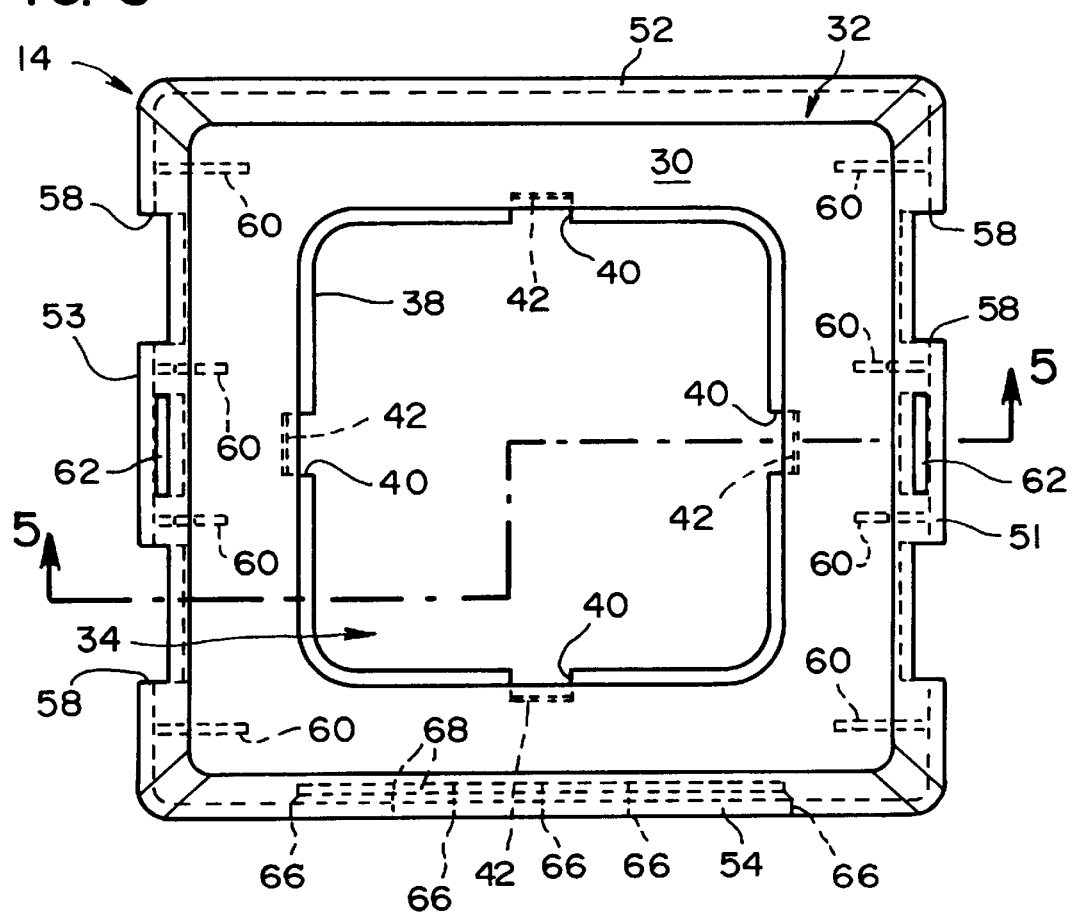
FIG. 3 is a top plan view of the cover member of the device box illustrated in FIGS. 1 and 2.
Figure 4:
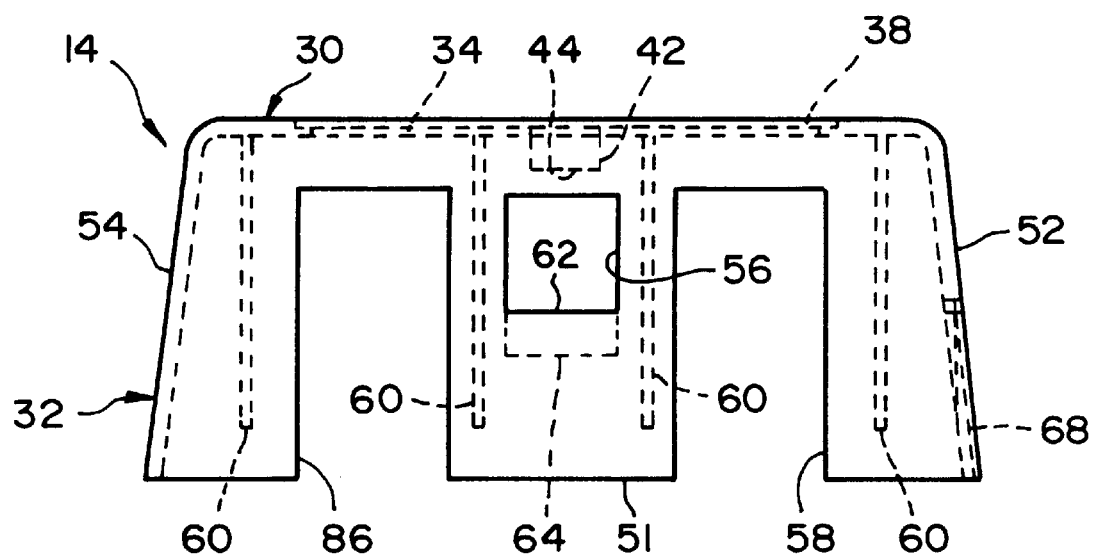
FIG. 4 is an end elevational view of the cover member illustrated in FIG. 3 of the device box illustrated in FIGS. 1 and 2.
Figure 5:
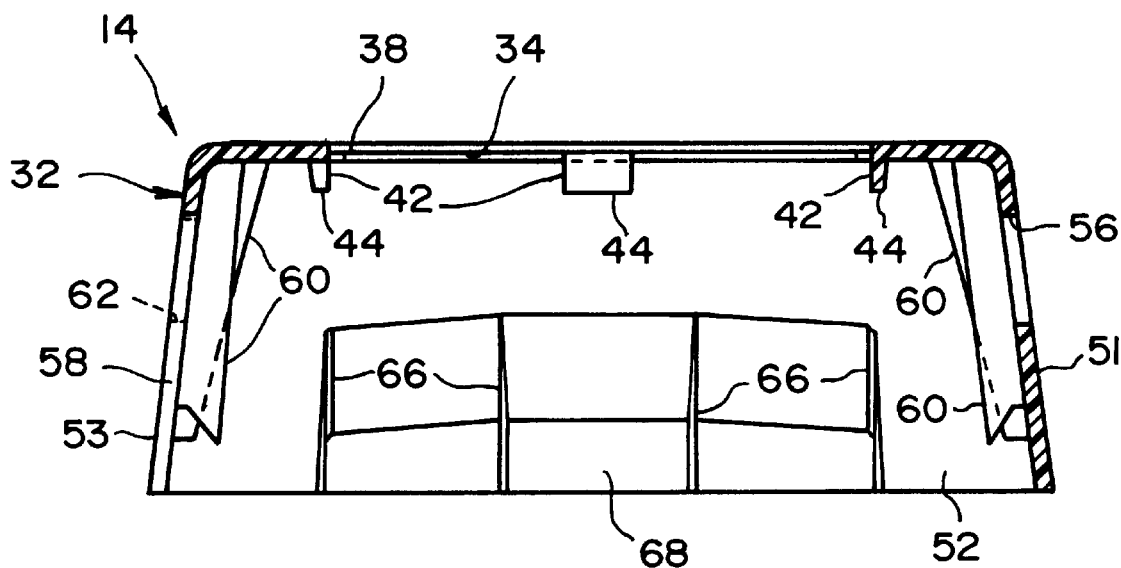
FIG. 5 is a transverse cross-sectional view of the cover member illustrated in FIGS. 3 and 4 taken along section line 5—5 of FIG. 3.
Figure 6:
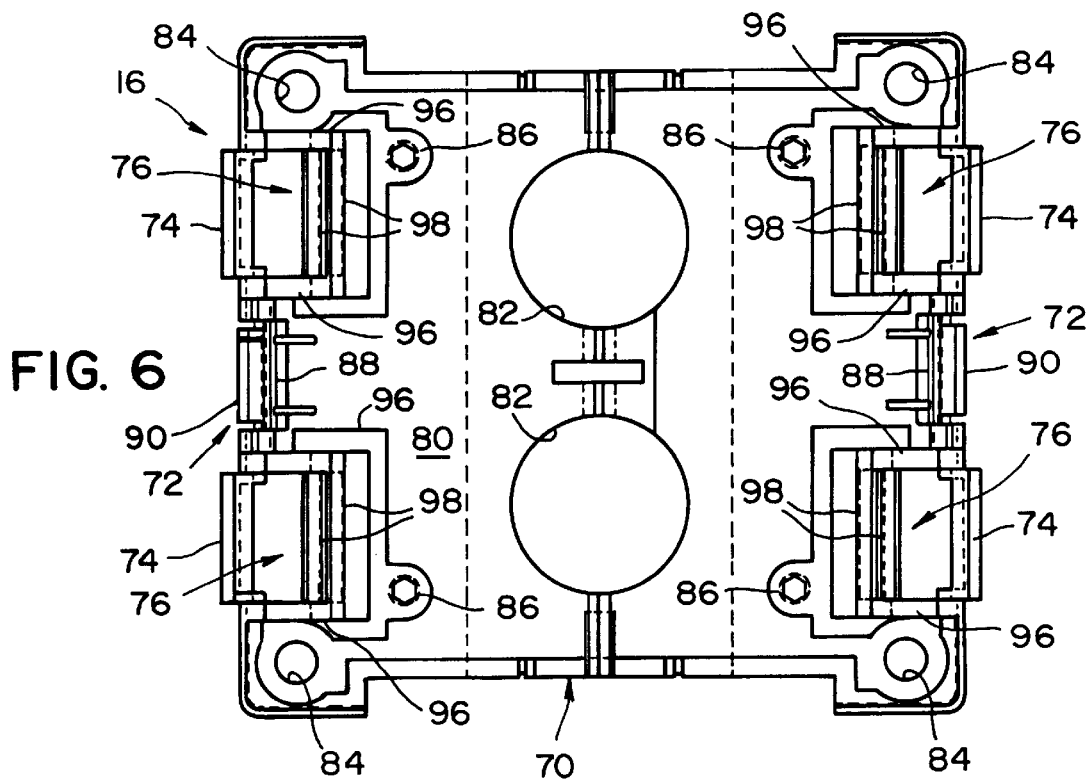
FIG. 6 is a top plan view of the base member of the device box illustrated in FIGS. 1 and 2.
Figure 7:
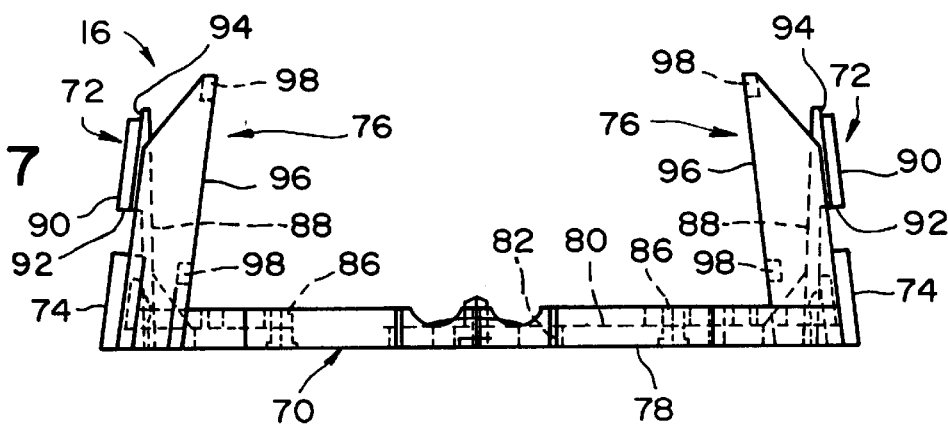
FIG. 7 is an end elevational view of the base member illustrated in FIG. 6 of the device box illustrated in FIGS. 1 and 2.
Figure 8:
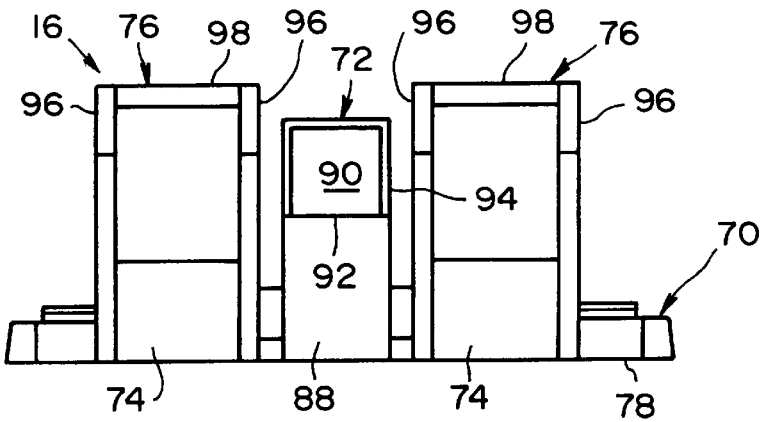
FIG. 8 is a side elevational view of the base member illustrated in FIGS. 6 and 7 of the device box illustrated in FIGS. 1 and 2.

As particularly in FIGS. 3–5, cover member 14 is integrally constructed or molded as a one-piece, unitary member, which is preferably constructed of a hard, rigid plastic material with limited flexibility and resiliency to provide a snap-fit between cover member 14 and face plate 12 and/or base member 16. Preferably, cover member 14 is constructed of a thermoplastic material by injection molding in which straight draw-type molds are used to produce a one-piece, unitary cover member with only non-hidden surfaces. Of course, cover member 14 could be constructed with hidden surfaces, if needed and/or desired. However, this would most likely increase the manufacturing costs of the cover member.

Cover member 14 includes a top wall portion 30 and a side wall portion 32 extending downwardly and outwardly from top wall portion 30. Top wall portion 30 preferably has a flat, planar surface with a substantially rectangular shape as seen in FIG. 3.

Top wall portion 30 includes a centrally located rectangular opening 34, a ledge 38 with four cutouts 40, and four coupling flanges 42. Ledge 38 is formed about the periphery of opening 34 for accommodating ledge 28 of face plate 12 so that face plate 12 has its outer surface substantially flush with the outer surface of top wall portion 30 to create a substantially flat smooth, continuous outer surface. Cutouts 40 are positioned along ledge 38 to accommodate latch members 26 of face plate 14. Thus, latch members 26 can selectively pass through two of the cutouts 40 when face plate 12 is being coupled to cover member 14.

Coupling flanges 42 extend downwardly from top wall portion 30 with one of the coupling flanges 42 being positioned adjacent each of the cutouts 40. Each of the coupling flanges 42 includes a downwardly facing latching surface 44. Latching surfaces 44 of cover member 14 engage latching surfaces 29 of the hook shaped latching members 26 of face plate 12 for releasably coupling face plate 12 to cover member 14 via a snap-fit. Specifically, face plate 12 can be snap-fitted to cover member 14 by application of a force in a direction substantially perpendicular to the top surface of top wall portion 30 such that latch members 26 are initially forced inwardly by coupling flanges 42 as they pass through cutouts 40, and then, due to the resiliency of latch members 26, the latch members 26 resiliently snap back towards their original position such that they engage two of the latching surfaces 44 of cover member 14.

Side wall portion 32 includes four substantially planar sides 51, 52, 53 and 54. Sides 51 and 53 are substantially identical to each other, except that they are mirror images of each other. Accordingly, like reference numerals will be utilized for each of the sides 51 and 53. Each of the sides 51 and 53 includes a centrally located latching aperture 56, a pair of wire access openings 58 and a plurality of reinforcing ribs 60 extending between the inside surfaces of sides 51 and 53 and the inside surface of top wall portion 30.

Latching apertures 56 form a first pair of coupling members of the latching arrangement 17 for releasably coupling cover member 14 to base member 16 via a snap-fit. Each of the latching apertures 56 is preferably a rectangular opening having a latching surface 62 which extends substantially parallel to top wall portion 30. Sides 51 and 53 are thinned adjacent latching surfaces 62 to form a pair of angled surfaces 64 to assist in molding of cover member 14 as well as to assist in the coupling of cover member 14 to base member 16.

Sides 52 and 54 are substantially identical, except that side 52 has a plurality of frangible seams or grooves 66 which define knock-out tabs 68 for creating various size wire access openings in side 52. Specifically, the knock-out tab or tabs 68 formed by grooves 66 can be twisted such that a portion of the side wall breaks along grooves 66 to create the desired opening.

Each of the sides 51–54 is preferably angled about 7° from vertical so that cover member 14 can be constructed without any hidden surfaces. Specifically, by angling sides 51 and 53, latching surfaces 62 are positioned outwardly from top wall portion 30 such that latching surfaces 62 are visible in a top plan view of cover member 14 as seen in FIG. 3. Since sides 51–54 are angled downwardly and outwardly from top wall portion 30, each of the sides 51–54 is shaped substantially as a regular trapezoid when viewed in elevation as seen in FIGS. 4 and 5.

Referring now to the base member 16, as particularly seen in FIGS. 1 and 6–8, base member 16 is integrally formed as a one-piece, unitary member, which is preferably constructed of a hard, rigid plastic material with limited flexibility and resiliency for releasably coupling base member 16 to cover member 14 via a snap-fit. Base member 16 includes a base portion 70 for mounting device box 10 to a support structure (not shown), a pair of latch members 72 for releasably coupling base member 16 to cover member 14, four side wall portions 74 for partially closing wiring openings 58 of cover member 14, and four mounting members 76 to support wiring connectors (not shown).

Base portion 70 is a substantially flat member having a substantially flat exterior surface 78 for engaging a support surface to mount device box 10 thereon, and an interior surface 80 for selectively mounting electrical devices thereon. Interior surface 80 of base portion 70 has a reinforcing rib around its periphery to provide additional strength and rigidity to base portion 70. Base portion 70 also includes a pair of wire access openings 82, four mounting holes 84 located in each of the corners of base portion 70, and four device mounting holes 86.

Mounting holes 84 are preferably generally circular holes which are adapted to receive a conventional fastener such as a screw for attaching base member 16 to a support surface. Of course, base member 16 can be mounted to a support surface by using other fastening means such as adhesive, and/or adhesive strips attached to the exterior surface 78 of base portion 70.

Device mounting holes 86 are preferably hexagonal bores which are designed to be self-tapping by using a conventional threaded fastener to fasten a device (not shown) or the like within device box 10.

Latch members 72 form a second pair of coupling members of the latching arrangement 17 for releasably coupling base member 16 to cover member 14 via a snap-fit. Each of the latch members 72 includes an arm portion 88, and a release button 90. Arm portion 88 extends outwardly and substantially perpendicularly from base portion 70 for resiliently coupling release button 90 to base portion 70. The resiliency of arm portion 88 permits release button 90 to move in a direction transverse to arm portion 88 for releasably coupling cover member 14 to base member 16. Specifically, each of the release buttons 90 is substantially rectangular shaped member which is sized to be snugly received within one of the latching apertures 56.

Each release button 90 has a latching surface 92 for engaging latching surface 62 of its corresponding latching aperture 56. The outer surfaces of release buttons 90 are slightly angled such that the outer surfaces of release buttons 90 are substantially flush with the outer surfaces of sides 51 and 53 of cover member 14. More specifically, a shoulder 94 is created on each latch member 72 between arm portion 88 and release button 90 for engaging the interior surfaces of sides 51 and 53 surrounding latching apertures 56 to limit outward movement of release buttons 90 within latching apertures 56.

Side wall portions 74 are substantially rectangular shaped planar members extending upwardly from base portion 70 and angled inwardly such that its exterior surface is substantially flush with the exterior surface of sides 51 and 53 of cover member 14. In particular, side wall portions 74 are received within wire openings 58 of cover member 14 to partially close off wire openings 58 in sides 51 and 53 of cover member 14.

Mounting members 76 are each substantially identical to each other, and thus identical reference numerals will be used to identify like parts. Each of the mounting members 76 includes a pair of flanges 96 extending upwardly from base portion 70 and a pair of crossbars 98 extending between flanges 96. One of the crossbars 98 is positioned at the free ends of flanges 96, while the other of the crossbars 98 is positioned substantially adjacent base portion 70. Flanges 96 are angled inwardly so as to engage the inner surfaces of sides 51 and 53 of cover member 14 in such a manner as to straddle wire openings 58.

Installation of Device Box 10

Device box 10 can be installed on a supporting surface such as a wall of a building by attaching base member 16 thereto in a conventional manner. For example, base member 16 can be attached to a support surface via fasteners passing through mounting holes 84 in base portion 70 or by some sort of adhesive or adhesive strips attached to the exterior surface 78 of base portion 70. Depending on the method of attaching base member 16 to the supporting surface, cover member 14 with face plate 12 is either already attached to base member 16, or is subsequently attached thereto by the latching arrangement of device box 10. Specifically, cover member 14 can be easily attached to base member 16 by merely placing cover member 14 over base member 16 and merely pushing cover member 14 such that latch members 72 of base member 16 engage latching apertures 56 of cover member 14 via a snap-fit. This snap-fit results from forcing the resilient arm portions 88 with release buttons 90 thereon inwardly and then allowing the arm portions 88 to be biased outwardly when release buttons 90 are aligned with latching apertures 56. Thus, during coupling of cover member 14 to base member 16, latch members 72 are initially biased inwardly by sides 51 and 53 of cover member 14 by application of a force on cover member 14 in a direction substantially perpendicular to base portion 70. The latch members 72 then spring outwardly due to the resiliency of arm portions 88 such that latching surfaces 62 of apertures 56 engage latching surfaces 92 of release buttons 90. In this embodiment, the latching surfaces 62 and 92 are substantially parallel to each other to securely lock cover member 14 to base member 16.

Once device box 10 is installed on a supporting surface, cover member 14 can be easily removed from base member 16 by pushing release buttons 90 inwardly such that latching surfaces 92 of latch members 72 disengage latching surfaces 62 of latching apertures 56. This then allows cover member 14 to be removed from base member 16 further installing conduits, wirings, fiber optic cables and the like therein. For example, the knock-out tab 68 can be removed from side 52 of base member 16 for running a conduit with wires into device box 10.

Device Box 110

Referring now to FIGS. 9–17, a device box 110 in accordance with a second embodiment of the present invention is illustrated. Device box 110 includes a cover member 114 and a base member 116 which are releasably coupled together via a snap-fit. Device box 110 is a modified version of device box 10 discussed above. Accordingly, only the differences between device 110 and device 10 will be discussed and illustrated in detail herein. The latching arrangement of this embodiment utilizes three snap-fit coupling arrangements between cover member 114 and base member 116.

Preferably, cover member 114 and base member 116 are each constructed out of a hard, rigid plastic material with limited flexibility and resiliency so that cover member 114 is releasably coupled to base member 116 via a snap-fit. Cover member 114 and base member 116 are each formed by straight draw-type injection molding such that construction of device box 110 does not require the use of sliders in its construction. Of course, it will be apparent to those skilled in the art from this disclosure that one or two of the parts of device box 110 could be constructed using other injection molding techniques which require the use of a slider. However, using injection molding techniques which requires a slider increases the cost of construction of the subject device box 110.

Figure 9:
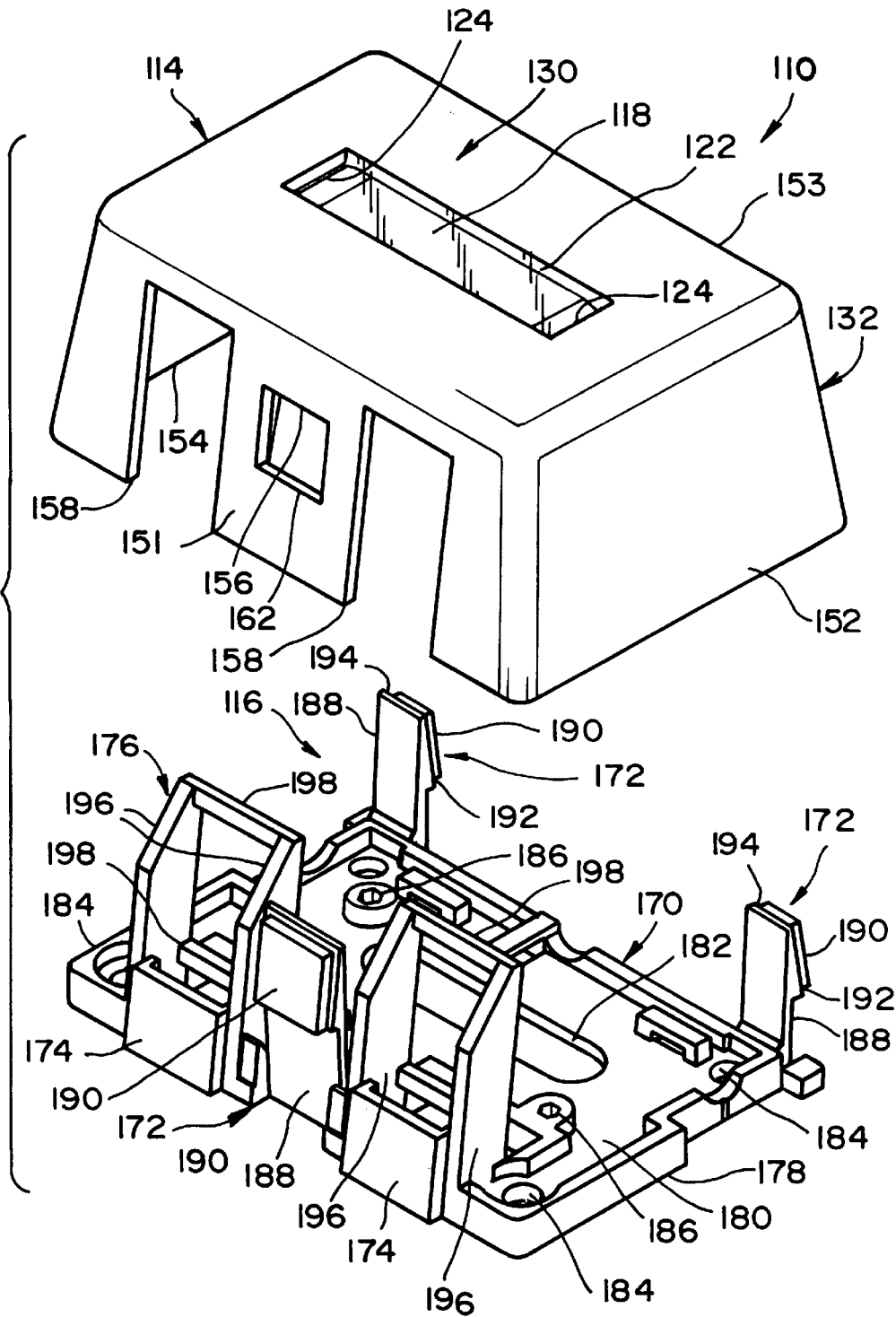
FIG. 9 is a front side exploded perspective view of a device box in accordance with a second embodiment of the present invention.
Figure 10:
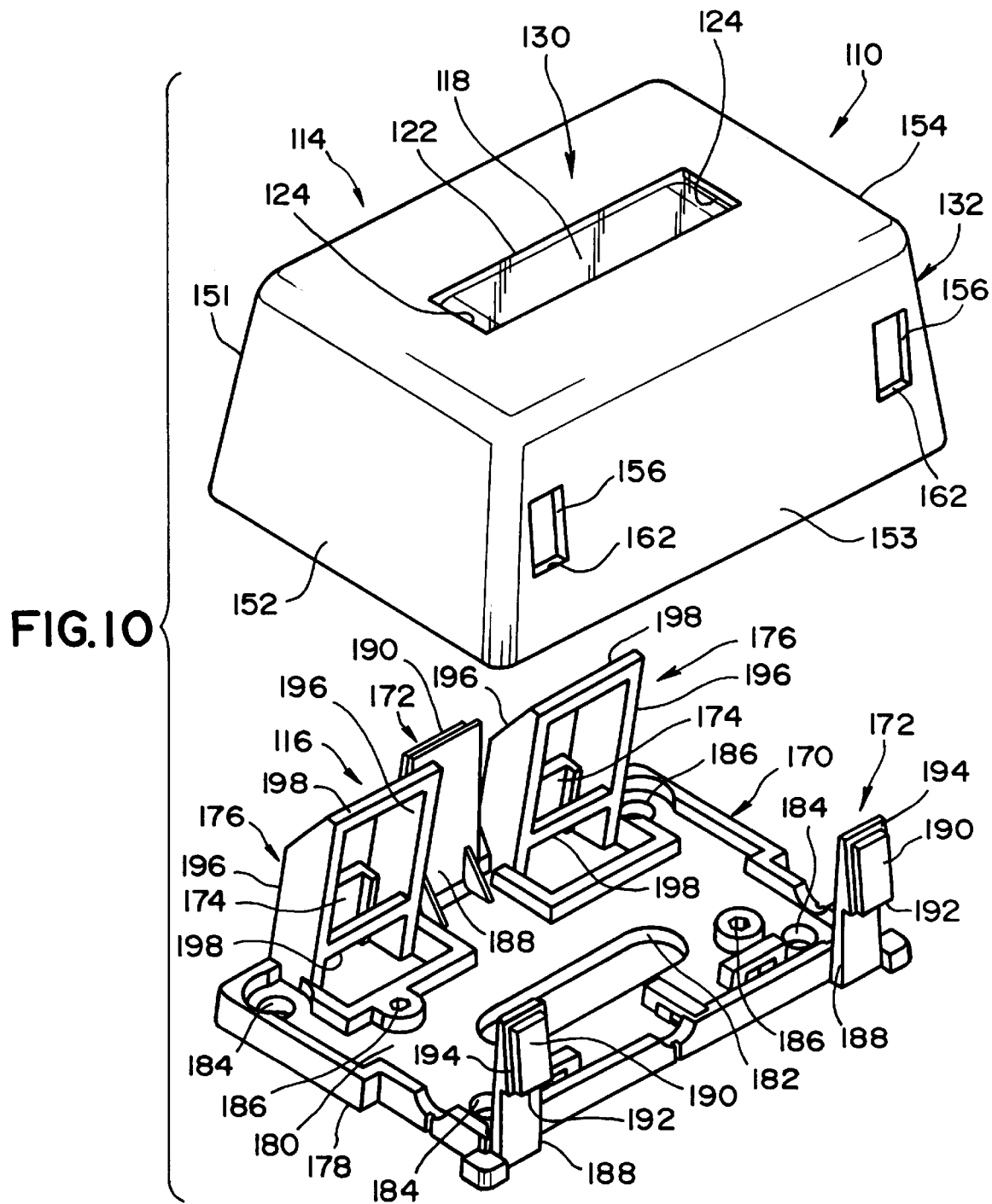
FIG. 10 is a rear side exploded perspective view of the deice box illustrated in FIG. 9.

As seen in FIGS. 9 and 10, cover member 114 does not include a separate face plate as in the preceding embodiment, but rather has an integral face plate with a recess 122 to removably couple plastic shield 118 thereto for retaining therebetween a sheet material with identifying indicia thereon. Shield 118 is preferably a one-piece, unitary member which is integrally formed from a substantially rigid, hard plastic material with limited flexibility and resiliency to allow a snap-fit between shield 118 and cover member 114. Shield 118 is substantially identical to shield 18 discussed above, and thus, shield 118 will not be discussed or illustrated in detail herein.

Rectangular recess 122 of cover member 114 has a pair of openings 124 for receiving the end tabs of shield 118 therein via a snap-fit. Specifically, shield 118 is flexed or bowed outwardly so that the end tabs of shield 118 move inwardly towards each other so that the end tabs of shield 118 can be received within openings 124 of cover member 114 via a snap-fit. In this position, the outer surface of shield 118 is flush with the outer surface of cover member 114 so that the transition between cover member 114 and shield 118 is substantially smooth and uninterrupted.

As particularly in FIGS. 11–14, cover member 114 is integrally constructed or molded as a one-piece, unitary member, which is preferably constructed of a hard, rigid plastic material with limited flexibility and resiliency to provide a snap-fit between cover member 114 and base member 116. Preferably, cover member 114 is constructed of a thermoplastic material by injection molding in which straight draw-type molds are used to produce a one-piece, unitary cover member with only non-hidden surfaces. Of course, cover member 114 could be constructed with hidden surfaces, if needed and/or desired. However, this would most likely increase the manufacturing costs of the cover member.

Figure 11:
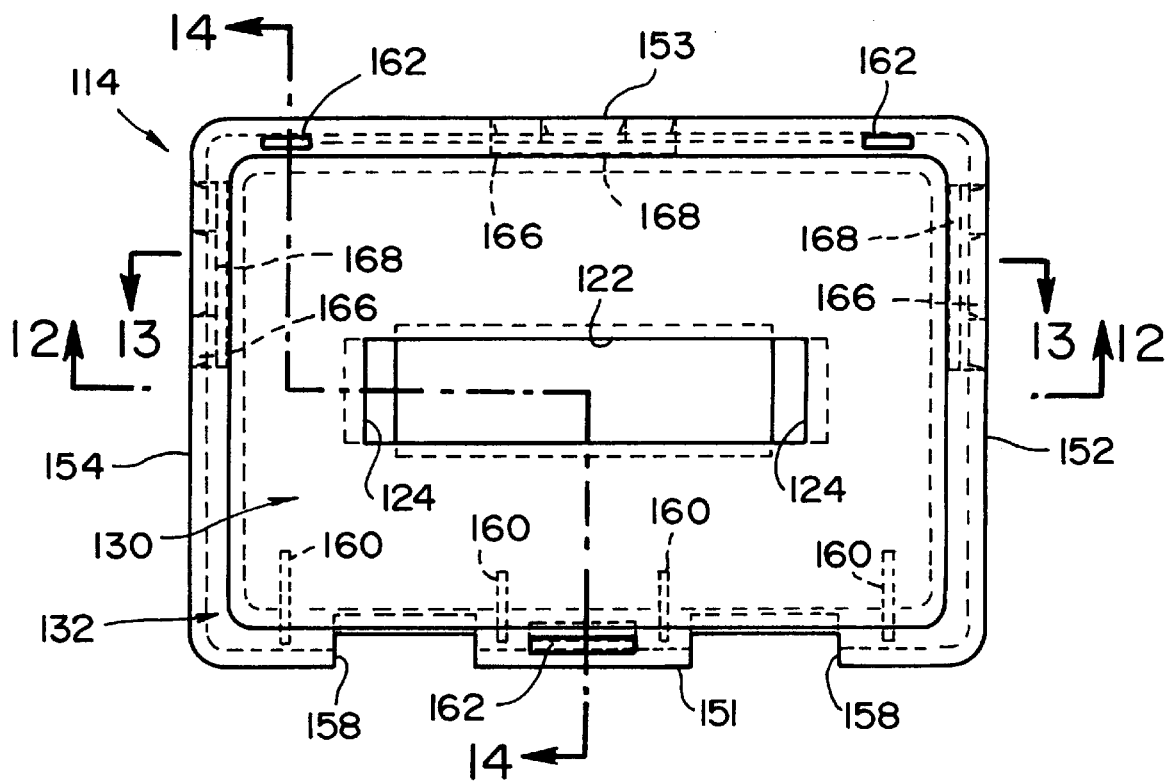
FIG. 11 is a top plan view of the cover member of the device box illustrated in FIGS. 9 and 10.

Cover member 114 includes a top wall portion 130 and a side wall portion 132 extending downwardly and outwardly from top wall portion 130. Top wall portion 130 preferably has a flat, planar surface with a substantially rectangular shape as seen in FIG. 11. Top wall portion 130 includes centrally located rectangular opening 122 for receiving shield 118 as discussed above.

Side wall portion 132 includes four substantially planar sides 151, 152, 153 and 154. Side 151 includes a centrally located latching aperture 156, a pair of wire access openings 158 and a plurality of reinforcing ribs 160 extending between the inside surface of side 151 and the inside surface of top wall portion 130. Side 153, on the other hand, includes a pair of latching apertures 156, and a plurality of frangible seams or grooves 166 which define a knock-out tab 168 for creating a wire access opening in side 153. Specifically, the knock-out tab 168 formed by grooves 166 can be twisted such that the side wall breaks along groove 166 to create the desired opening.

Latching apertures 156 form a first set of coupling members of the latching arrangement for releasably coupling cover member 114 to base member 116 via a snap-fit. Latching apertures 156 are preferably a rectangular openings with each having a latching surface 162 which extends substantially parallel to top wall portion 130. Sides 151 and 153 are thinned adjacent latching surfaces 162 to form a pair of angled surfaces 164 to assist in molding of cover member 114 as well as to assist in the coupling of cover member 114 to base member 116.

Sides 152 and 154 are substantially identical, except that they are mirror images of each other. Like side 153, sides 152 and 154 each has a plurality of frangible seams or grooves 166 which define a knock-out tab 168 for creating a wire access opening in sides 152 and 154.

Figure 12:
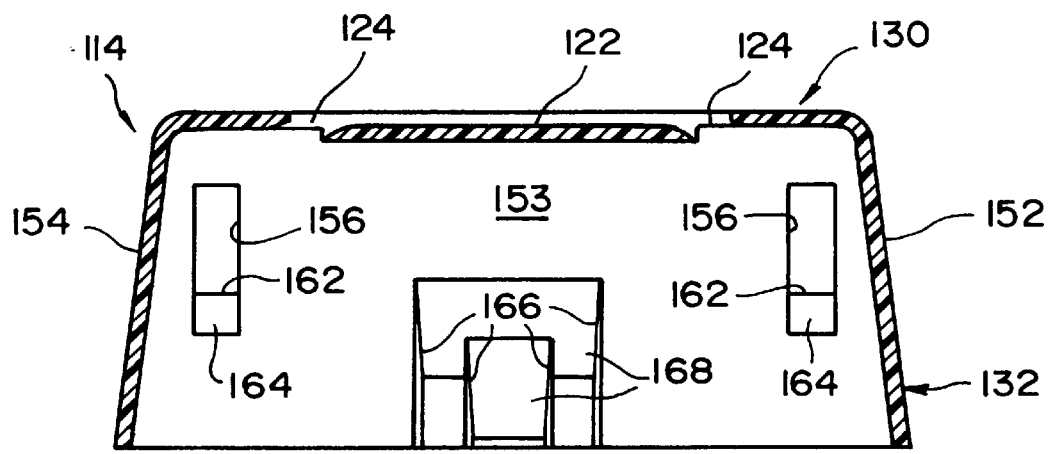
FIG. 12 is a transverse cross-sectional view of the cover member illustrated in FIG. 11 taken along section 12—12 of FIG. 11.
Figure 13:
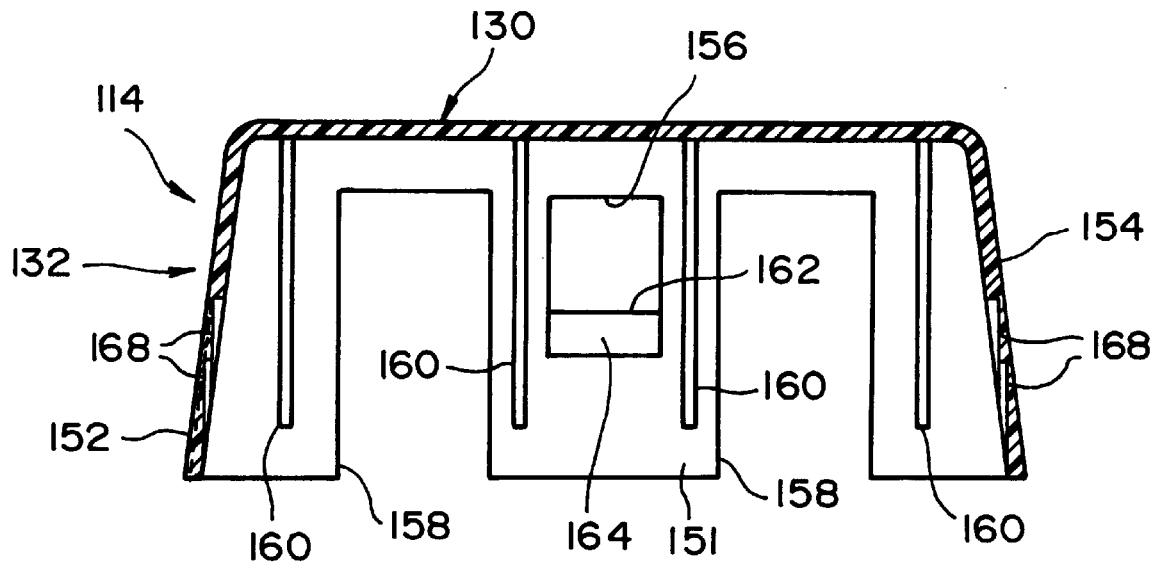
FIG. 13 is a transverse cross-sectional view of the cover member illustrated in FIGS. 11 and 12 taken along section line 13—13 of FIG. 11.
Figure 14:
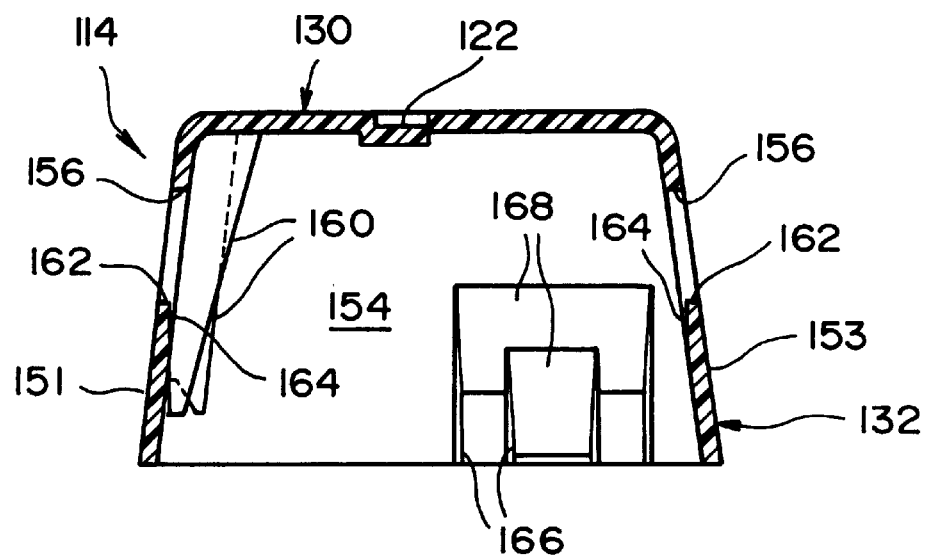
FIG. 14 is a transverse cross-sectional view of the cover member illustrated in FIGS. 11–13 taken along section line 14—14 of FIG. 11.
Figure 15:
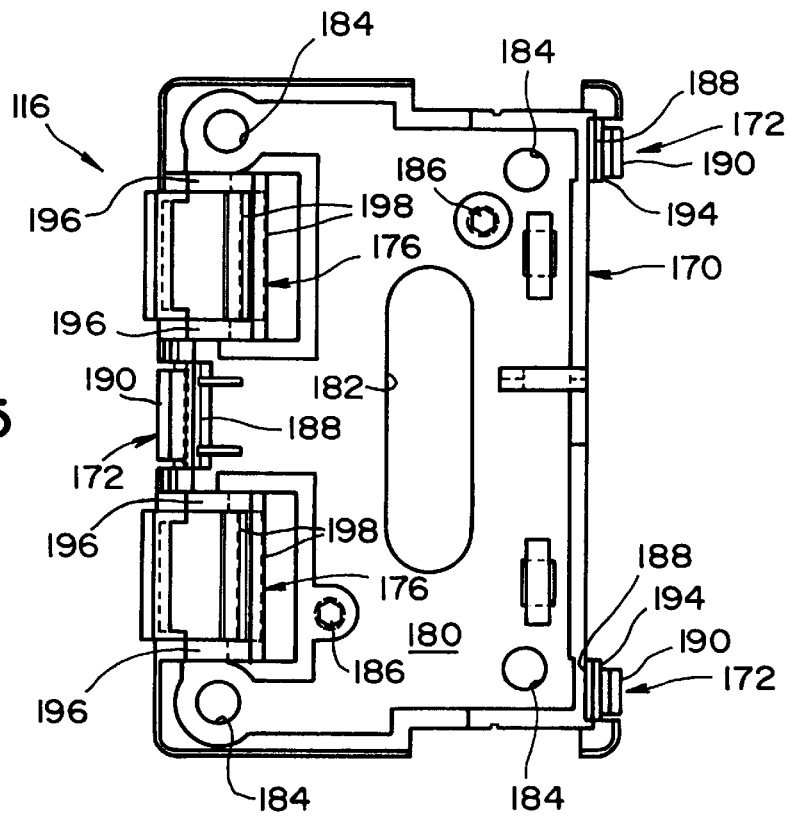
FIG. 15 is a top plan view of the base member of the device box illustrated in FIGS. 9 and 10.
Figure 16:
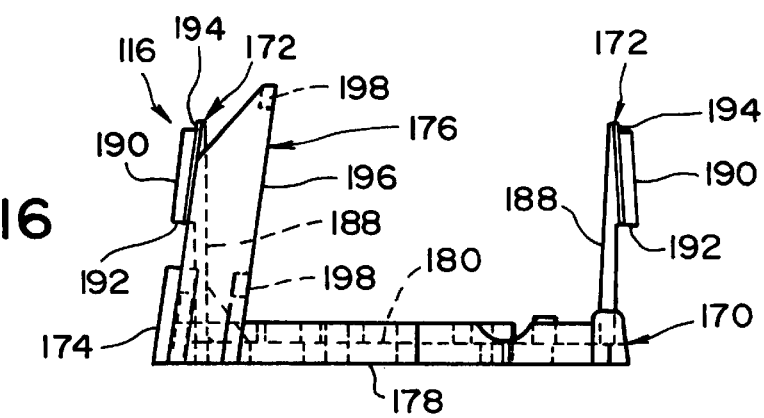
FIG. 16 is an end elevational view of the base member illustrated in FIG. 15 of the device box illustrated in FIGS. 9 and 10.
Figure 17:
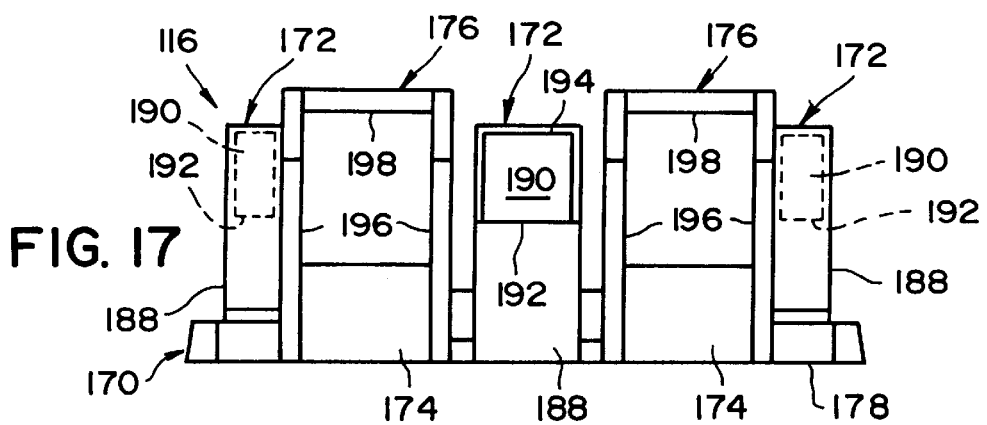
FIG. 17 is a side elevational view of the base member illustrated in FIGS. 15 and 16 of the device box illustrated in FIGS. 9 and 10.
Figure 22:
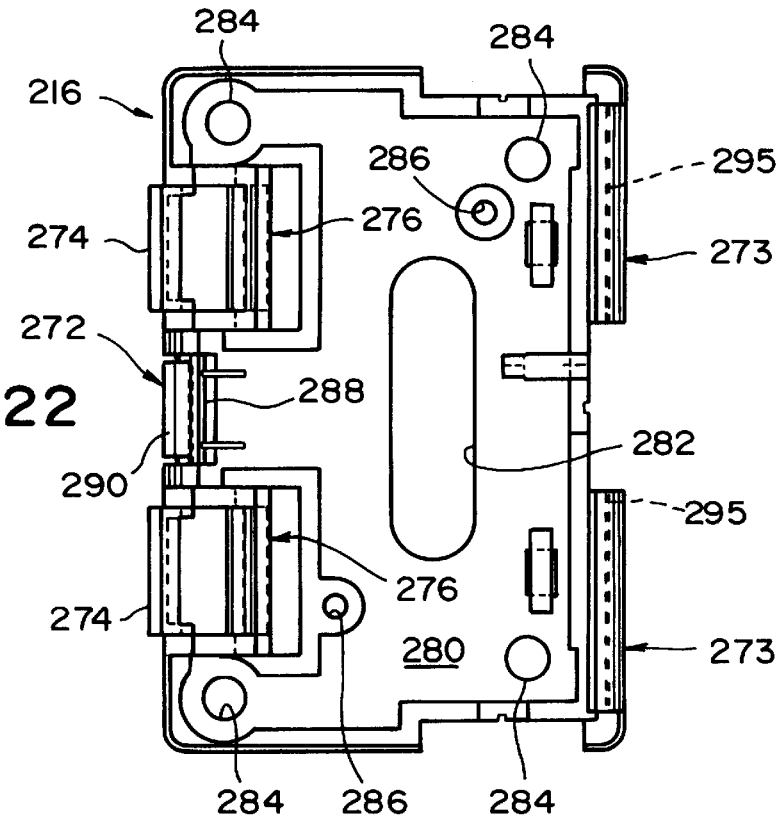
FIG. 22 is a top plan view of the base member of the device box illustrated in FIG. 18.
Figure 23:
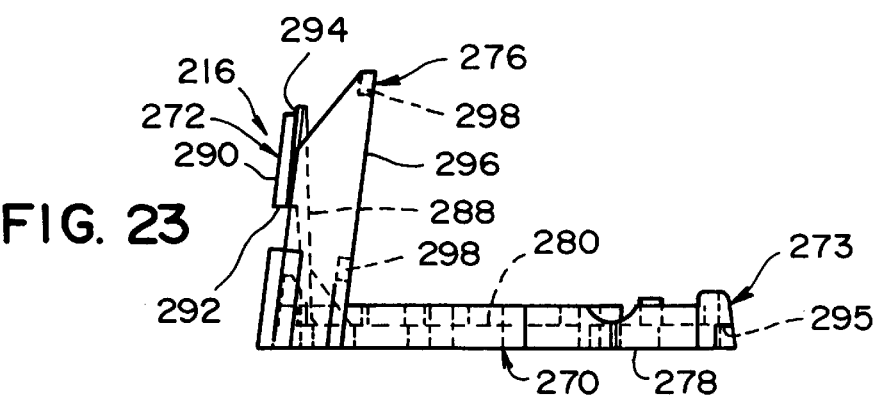
FIG. 23 is a side elevational view of the base member illustrated in FIG. 22 of the device box illustrated in FIG. 18.
Figure 24:
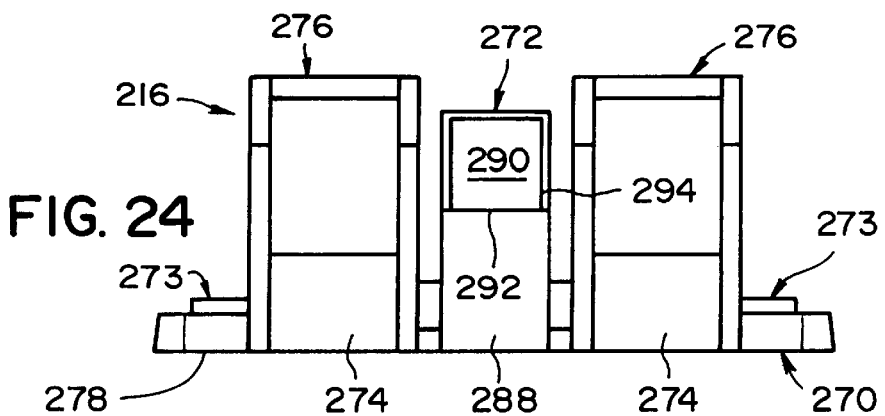
FIG. 24 is an end elevational view of the base member illustrated in FIG. 22 and 23 of the device box illustrated in FIG. 18.

Each of the sides 151–154 is preferably angled about 7° from vertical so that cover member 114 can be constructed without any hidden surfaces. Specifically, by angling sides 151 and 153, latching surfaces 162 are positioned outwardly from top wall portion 130 such that latching surfaces 162 are visible in a top plan view of cover member 114 as seen in FIG. 11. Since sides 151–154 are angled downwardly and outwardly from top wall portion 130, each of the sides 151–154 is shaped substantially as a regular trapezoid when viewed in elevation as seen in FIGS. 12–14.

As particularly seen in FIGS. 9, 10 and 15–17, base member 116 is integrally formed as a one-piece, unitary member, which is preferably constructed of a hard, rigid plastic material with limited flexibility and resiliency for releasably coupling base member 116 to cover member 114 via a snap-fit. Base member 116 includes a base portion 170 for mounting device box 110 to a support structure (not shown), three latch members 172 for releasably coupling base member 116 to cover member 114, two side wall portions 174 for partially closing wiring openings 158 of cover member 114, and two mounting members 176 to support wiring connectors (not shown).

Base portion 170 is a substantially flat member having a substantially flat exterior surface 178 for engaging a support surface to mount device box 110 thereon, and an interior surface 180 for selectively mounting an electrical device thereon. Interior surface 180 of base portion 170 has a reinforcing rib around its periphery to provide additional strength and rigidity to base portion 170. Base portion 170 also includes a wire access opening 182, four mounting holes 184 located in each of the corners of base portion 170, and two device mounting holes 186.

Mounting holes 184 are preferably generally circular holes which are adapted to receive a conventional fastener such as a screw for attaching base member 116 to a support surface. Of course, base member 116 can be mounted to a support surface by using other fastening means such as adhesive, and/or adhesive strips attached to the exterior surface 178 of base portion 170.

Device mounting holes 186 are preferably hexagonal bores which are designed to be self-tapping by using a conventional threaded fastener to fasten a device (not shown) or the like within device box 110.

Latch members 172 form a second set of coupling members of the latching arrangement for releasably coupling base member 116 to cover member 114 via a snap-fit. Each of the latch members 172 includes an arm portion 188 and a release button 190. Arm portion 188 extends outwardly and substantially perpendicularly from base portion 170 for resiliently coupling release button 190 to base portion 170. The resiliency of arm portion 188 permits release button 190 to move in a direction transverse to arm portion 188 for releasably coupling cover member 114 to base member 116. Specifically, each of the release buttons 190 is substantially rectangular shaped member which is sized to be snugly received within one of the latching apertures 156.

Each release button 190 has a latching surface 192 for engaging latching surface 162 of its corresponding latching aperture 156. The outer surfaces of release buttons 190 are slightly angled such that the outer surfaces of release buttons 190 are substantially flush with the outer surfaces of sides 151 and 153 of cover member 114. More specifically, a shoulder 194 is created on each latch member 172 between arm portion 188 and release button 190 for engaging the interior surfaces of sides 151 and 153 surrounding latching apertures 156 to limit outward movement of release buttons 190 within latching apertures 156.

Side wall portions 174 are substantially rectangular shaped planar members extending upwardly from base portion 170 and angled inwardly such that its exterior surface is substantially flush with the exterior surface of side 151 of cover member 114. In particular, side wall portions 174 are received within wire openings 158 of cover member 114 to partially close off wire openings 158 in side 151 of cover member 114.

Mounting members 176 are each substantially identical to each other, and thus identical reference numerals will be used to identify like parts. Each of the mounting members 176 includes a pair of flanges 196 extending upwardly from base portion 170 and a pair of crossbars 198 extending between flanges 196. One of the crossbars 198 is positioned at the free ends of flanges 196, while the other of the crossbars 198 is positioned substantially adjacent base portion 170. Flanges 196 are angled inwardly so as to engage the inner surface of side 151 of cover member 114 in such a manner as to straddle wire openings 158.

Device Box 210

Referring now to FIGS. 18–24, a device box 210 in accordance with a third embodiment of the present invention is illustrated. Device box 210 includes a cover member 214 and a base member 216 which are releasably coupled together via a snap-fit. Device box 210 is a modified version of device box 110 discussed above. Accordingly, only the differences between device box 210 and device box 110 will be further discussed and illustrated herein. In this embodiment, the latching arrangement in accordance with the present invention is incorporated into device box with a conventional latching arrangement. In other words, this embodiment illustrates a latching arrangement incorporated into a device box 210 which includes hidden surfaces.

Preferably, cover member 214 and base member 216 are each constructed out of a hard, rigid plastic material with limited flexibility and resiliency so that cover member 214 is releasably coupled to base member 216 via a snap-fit. Base member 216 is formed by straight draw-type injection molding such that the use of sliders are not required in its construction. Cover member 214, on the other hand, has a pair of hidden surfaces as discussed below. Thus, cover member 214 cannot be constructed by straight draw-type injection molding.

As seen in FIG. 18, cover member 214 does not include a separate face plate, but rather has an integral face plate with a recess 222 to removably couple a clear plastic shield 218 thereto for retaining therebetween a sheet material with identifying indicia thereon. Shield 218 is preferably a one-piece, unitary member which is integrally formed from a substantially rigid, hard plastic material with limited flexibility and resiliency to allow a snap-fit between shield 218 and face plate 212. Shield 218 is substantially identical to shield 18 discussed above, and thus, shield 218 will not be discussed or illustrated in detail herein.

Recess 222 of cover member 214 has a pair of openings 224 for receiving shield 218 therein via a snap-fit so that the outer surface of shield 218 is substantially flush with the outer surface of cover member 214 to provide a substantially smooth and uninterrupted transition therebetween.

As particularly in FIGS. 19–21, cover member 214 is integrally constructed or molded as a one-piece, unitary member, which is preferably constructed of a hard, rigid plastic material with limited flexibility and resiliency to provide a snap-fit between cover member 214 and base member 216. Preferably, cover member 214 is constructed of a thermoplastic material by injection molding to produce a one-piece, unitary cover member.

Cover member 214 includes a top wall portion 230 with recess 222 therein and a side wall portion 232 extending downwardly and outwardly from top wall portion 230. Top wall portion 230 preferably has a flat, planar surface with a substantially rectangular shape as seen in FIGS. 18 and 19.

Side wall portion 232 includes four substantially planar sides 251, 252, 253 and 254. Side 251 includes a centrally located latching aperture 256, a pair of wire access openings 258, and a plurality of reinforcing ribs 260 extending between the inside surfaces of side surface 251 and the inside surface of top wall portion 230.

Latching aperture 256 forms a first part or coupling member of the latching arrangement for releasably coupling cover member 214 to base member 216 via a snap-fit. Latching aperture 256 is preferably a rectangular opening having a latching surface 262 which extends substantially parallel to top wall portion 230. Side 251 is thinned adjacent latching surface 262 to form a ramped surface 264 to assist in molding of cover member 214 as well as to assist in the coupling of cover member 214 to base member 216.

Side 253 includes a pair of inwardly projecting detents 263, a pair of reinforcing ribs 265, and a plurality of frangible seams or grooves 266 which define a knock-out tab 268 for creating a wire access opening in side 253. Each detent 263 has a latching surface 267 for engaging a portion of base member 216 for releasably coupling cover member 214 to base member 216.

Sides 252 and 254 are substantially identical, except that they are mirror images of each other. Each of the sides 252 and 254 has a plurality of frangible seams or grooves 266 which define knock-out tabs 268 for creating a wire access opening in each of sides 252 and 254. Specifically, the knock-out tab or tabs 268 formed by grooves 266 can be twisted such that a portion of the side wall breaks along groove 266 to create the desired opening.

Each of the sides 251–254 is preferably angled about 7° from vertical so that cover member 214 can be constructed to reduce the number of hidden surfaces. Specifically, by angling side 251, latching surface 262 is positioned outwardly from top wall portion 230 such that latching surface 262 is visible in a top plan view of cover member 214 as seen in FIG. 19. The only hidden surfaces formed on cover member 214 are latching surfaces 267. Since sides 251–254 are angled downwardly and outwardly from top wall portion 230, each of the sides 251–254 is shaped substantially as a regular trapezoid when viewed in elevation as seen in FIGS. 19–21.

Referring now to the base member 216, as particularly seen in FIGS. 18 and 22–24, base member 216 is integrally formed as a one-piece, unitary member, which is preferably constructed of a hard, rigid plastic material with limited flexibility and resiliency for releasably coupling base member 216 to cover member 214 via a snap-fit. Base member 216 includes a base portion 270 for mounting device box 210 to a support structure (not shown), a first latch member 272 for engaging aperture 256 to releasably couple base member 216 to cover member 214, a pair of second latch members 273 for engaging detents 263 of cover member 214, a pair of side wall portions 274 for partially closing wiring openings 258 of cover member 214, and two mounting members 276 to support wiring connectors (not shown).

Base portion 270 is a substantially flat member having a substantially flat exterior surface 278 for engaging a support surface to mount device box 210 thereon, and an interior surface 280 for selectively mounting electrical devices thereon. Interior surface 280 of base portion 270 has a reinforcing rib around its periphery to provide additional strength and rigidity to base portion 270. Base portion 270 also includes a wire access openings 282, four mounting holes 284 located in each of the corners of base portion 270, and two device mounting holes 286.

Mounting holes 284 are preferably generally circular holes which are adapted to receive a conventional fastener such as a screw for attaching base member 216 to a support surface. Of course, base member 216 can be mounted to a support surface by using other fastening means such as adhesive, and/or adhesive strips attached to the exterior surface 278 of base portion 270.

Device mounting holes 286 are preferably hexagonal bores which are designed to be self-tapping by using a conventional threaded fastener to fasten a device (not shown) or the like within device box 210.

Latch member 272 forms a second part or coupling member of the latching arrangement for releasably coupling base member 216 to a cover member 214 via a snap-fit. Latch member 272 includes an arm portion 288 and a release button 290. Arm portion 288 extends outwardly and substantially perpendicularly from base portion 270 for resiliently coupling release button 290 to base portion 270. The resiliency of arm portion 288 permits release button 290 to move in a direction transverse to arm portion 288 for releasably coupling cover member 214 to base member 216. Specifically, release button 290 is substantially rectangular shaped member which is sized to be snugly received within latching aperture 256.

Release button 290 has a latching surface 292 for engaging latching surface 262 of latching aperture 256. The outer surface of release button 290 is slightly angled such that the outer surface of release button 290 is substantially flush with the outer surface of side 251 of cover member 214. More specifically, a shoulder 294 is created on latch member 272 between arm portion 288 and release button 290 for engaging the interior surface of side 251 surrounding latching aperture 256 to limit outward movement of release button 290 within latching aperture 256.

Latch member 273 is integrally formed with base portion 270, and is positioned along the edge opposite latch member 272. Latch member 273 has a latching surface 295 for releasably engaging detents 263 of cover member 214. Latching surface 295 is substantially parallel to exterior surface 278 of base portion 270, and forms an acute angle with latching surfaces 267 of detent 263. This arrangement allows cover member 114 to be released from base member 116 by pressing release button 290 inwardly to disengage latching surface 262 from latching surface 292, and then pivoting cover member 114 relative to base member 116 about an axis passing through the interface of latching surfaces 267 with latching surface 295, until latch member 272 separates from side 251 of cover member 216. Now, cover member 214 can be completely separated from base member 216.

Side wall portions 274 are substantially rectangular shaped planar members extending upwardly from base portion 270 and angled inwardly such that its exterior surface is substantially flush with the exterior surface of side 251 of cover member 214. In particular, side wall portions 274 are received within wire openings 258 of cover member 214 to partially close off wire openings 258 in side 251 of cover member 214.

Mounting members 276 are each substantially identical to each other, and thus identical reference numerals will be used to identify like parts. Each of the mounting members 276 includes a pair of flanges 296 extending upwardly from base portion 270 and a pair of crossbars 298 extending between flanges 296. One of the crossbars 298 is positioned at the free ends of flanges 296, while the other of the crossbars 298 is positioned substantially adjacent base portion 270. Flanges 296 are angled inwardly so as to engage the inner surface of side 251 of cover member 214 in such a manner as to straddle wire openings 258.

While only selected embodiments have been chosen to illustrate the invention, it will be understood by those skilled in the art that various changes and modifications can be made herein without departing from the scope of the invention as defined in appended claims.

What is claimed is:

1. A molded plastic device box, comprising:
 a first member, formed by injection molding without the use of sliders, said first member including a first wall portion, extending along a first plane, and at least one second wall portion, connected to said first wall portion at a first connecting edge, said second wall portion having a first inner surface and a first outer surface, and extending along a second plane at an acute angle with respect to a first vertically extending plane which extends normal to said first plane and passes through said first connecting edge, said second wall portion defining a first opening therein between a first transverse surface and a second transverse surface, said first transverse surface being at a first distance from said first plane measured in a first direction normal to said first plane, and extending at a second angle other than 90° with respect to said first plane between first and second edges at which said first transverse surface meets said first inner and first outer surfaces, respectively, said first edge being at a second distance from said first vertically extending plane taken in a second direction normal to said first vertically extending plane, and said second edge being further from said first vertically extending plane than said first edge, and said second transverse surface being at a third distance, greater than said first distance, from said first plane measured in a third direction normal to said first plane, and extending at a third angle other than 90° with respect to said first plane between third and fourth edges at which said second transverse surface meets said first inner and first outer surfaces, respectively, said third edge being at a fourth distance from said first vertically extending plane measured in a fourth direction normal to said first vertically extending plane, said fourth edge being further from said first vertically extending plane than said third edge, and said fourth distance being at least equal to said second distance; and a second member, formed by injection molding without the use of sliders, said second member including at least one latch member having a first latching surface, adapted to releasably engage at least one of said first and second transverse surfaces defining said first opening in said second wall portion, to releasably couple said second member to said first member.

2. A molded plastic device box as claimed in claim 1, wherein at least one of the following said first member has only first non-hidden surfaces, with said first and second transverse surfaces being of said first non-hidden surfaces; and said second member has only second non-hidden surfaces.

3. A molded plastic device box as claimed in claim 2, wherein said first member has only said first non-hidden surfaces; and said second member has only said second non-hidden surfaces.

4. A molded plastic device box as claimed in claim 1, wherein at least one of said first and second transverse surfaces extends substantially parallel to said first plane.

5. A molded plastic device box as claimed in claim 1, wherein at least one of said first and second transverse surfaces is substantially planar.

6. A molded plastic device box as claimed in claim 1, further comprising two of said second wall portions, disposed on opposite sides of said first vertically extending plane.

7. A molded plastic device box as claimed in claim 6, further comprising two of said latch members, each having a said first latching surface, adapted to releasably engage a respective said first opening in a respective one of said second wall portions to releasably couple said second member to said first member.

8. A molded plastic device box as claimed in claim 1, wherein said latch member includes a button thereon, adapted to enter said first opening in said second wall portion when said first latching surface engages at least one of said first and second transverse surfaces.

9. A molded plastic device box as claimed in claim 8, wherein said button includes a second outer surface, said first and second outer surfaces being substantially flush with each other when said first latching surface engages said at least one of said first and second transverse surfaces.

10. A molded plastic device box as claimed in claim 1, wherein said second wall portion further defines a second opening therein between a third transverse surface and a fourth transverse surface, to said third transverse surface being at a fifth distance from said first plane measured in a fifth direction normal to said first plane, and extending at a fourth angle other than 90° with respect to said first plane between fifth and sixth edges at which said third transverse surface meets said first inner and first outer surfaces, respectively, said fifth edge being at a sixth distance from said vertically extending plane measured in sixth direction normal to said vertically extending plane, and said sixth edge being further from said first vertically extending plane than said fifth edge, and said fourth transverse surface being at a seventh distance, greater than said fifth distance, from said first plane measured in a seventh direction normal to said first plane, and extending at a fifth angle other than 90° with respect to said first plane between seventh and eighth edges at which said fourth transverse surface meets said first inner and first outer surfaces, respectively, said seventh edge being at an eighth distance from said first vertically extending plane taken in an eighth direction normal to said first vertically extending plane, said eighth edge being further from said first vertically extending plane than said seventh edge, and said eighth distance being at least equal to said sixth distance; and said second member includes first and second of said latch members, said first latching surface of said first latch member being adapted to releasably engage at least one of said first and second transverse surfaces defining said first opening in said second wall portion, and said first latching surface of said second latch member being adapted to releasably engage at least one of said third and fourth transverse surfaces defining said second opening in said second wall portion, to releasably couple said second member to said first member.

11. A molded plastic device box as claimed in claim 1, wherein said first wall portion defines a first access opening therein; and said molded plastic device box further comprises a faceplate, adapted to mount to said first wall portion to substantially close said first access opening.

12. A molded plastic device box as claimed in claim 11, wherein said first wall portion includes an access opening defining edge defining said access opening; and said faceplate includes at least one faceplate latching member, adapted to releasably couple to said access opening defining edge to releasably couple said faceplate to said first wall portion.

13. A molded plastic device box as claimed in claim 11, wherein said faceplate is formed by injection molding without the use of sliders, and includes only third non-hidden surfaces.

14. A molded plastic device box as claimed in claim 11, wherein said faceplate has a faceplate surface; and said first wall portion includes a first wall surface;

said faceplate and first wall surfaces being substantially flush with each other when said faceplate couples to said first wall portion.

15. A molded plastic device box as claimed in claim 1, wherein said second member is a base member of said molded plastic device box, and includes a mounting portion, adapted to mount said second member to a support surface.

16. A molded plastic device box as claimed in claim 1, wherein said first member has a substantially trapezoidal shape, with said first wall portion forming a trapezoid top and said at least one second wall portion forming a trapezoid side.

17. A molded plastic device box as claimed in claim 1, further comprising:

at least one third wall portion, connected to said first wall portion at a second connecting edge, extending along a third plane at an acute angle with respect to a second vertically extending plane which extends normal to said first wall portion and passes through said second connecting edge.

18. A molded plastic device box as claimed in claim 17, wherein said third wall portion extends transversely to said second wall portion.

19. A molded plastic device box as claimed in claim 17, wherein said first member includes two of said second wall portions and two of said third wall portions, disposed alternately about a perimeter of said first wall portion.

20. A method for manufacturing a molded plastic device box comprising the steps of:

performing a first injection molding step employing a first pair of straight draw-type molds without sliders to form a first member, said first member including a first wall portion, extending along a first plane, and at least one second wall portion, connected to said first wall portion at a first connecting edge, said second wall portion extending along a second plane at an acute angle with respect to a first vertically extending plane which extends normal to said first plane and passes through said first connecting edge, said second wall portion defining a first opening therein between a first transverse surface and a second transverse surface, said first transverse surface being at a first distance from said first plane measured in a first direction normal to said first plane, and extending at a second angle other than 90° with respect to said first plane between first and second edges at which said first transverse surface meets said first inner and first outer surfaces, respectively, said first edge being at a second distance from said first vertically extending plane taken in a second direction normal to said first vertically extending plane, and said second edge being further from said first vertically extending plane than said first edge, and said second transverse surface being at a third distance, greater than said first distance, from said first plane measured in a third direction normal to said first plane, and extending at a third angle other than 90° with respect to said first plane between third and fourth edges at which said second transverse surface meets said first inner and first outer surfaces, respectively, said third edge being at a fourth distance from said first vertically extending plane measured in a fourth direction normal to said first vertically extending plane, said fourth edge being further from said first vertically extending plane than said third edge, and said fourth distance being at least equal to said second distance; and performing a second injection molding step employing a second pair of straight draw-type molds without sliders to form a second member, said second member including at least one latch member having a first latching surface, adapted to releasably engage at least one of said first and second edges defining said first opening in said second wall portion, to releasably couple said second member to said first member.

21. A method as claimed in claim 20, wherein:

said first injection molding step forms said first member with only first non-hidden surfaces; and said second injection molding step forms said second member with only second non-hidden surfaces.

* * * * *